(12) United States Patent
Mills et al.

(10) Patent No.: US 11,106,387 B2
(45) Date of Patent: Aug. 31, 2021

(54) STORAGE SYSTEM WITH ALLOCATED STORAGE DEVICE MECHANISM AND METHOD OF OPERATION THEREOF

(71) Applicant: Enmotus, Inc., Aliso Viejo, CA (US)

(72) Inventors: Andrew Mills, Coto de Caza, CA (US); Marshall Lee, Newport Coast, CA (US)

(73) Assignee: Enmotus, Inc., Irvine, CA (US)

( * ) Notice: Subject to any disclaimer, the term of this patent is extended or adjusted under 35 U.S.C. 154(b) by 84 days.

(21) Appl. No.: 16/569,634

(22) Filed: Sep. 12, 2019

(65) Prior Publication Data

US 2021/0081131 A1    Mar. 18, 2021

(51) Int. Cl.
*G06F 11/14*  (2006.01)
*G06F 3/06*   (2006.01)

(52) U.S. Cl.
CPC ............ *G06F 3/0653* (2013.01); *G06F 3/067* (2013.01); *G06F 3/0617* (2013.01); *G06F 3/0664* (2013.01); *G06F 3/0679* (2013.01)

(58) Field of Classification Search
CPC .. G06F 16/1767; G06F 3/0605; G06F 3/0608; G06F 3/0644; G06F 3/0665; G06F 3/0689; G06F 11/25; G06F 11/348; G06F 12/0866; G06F 12/0888; G06F 12/122; G06F 12/126; G06F 16/258; G06F 2003/0697; G06F 3/0601
See application file for complete search history.

(56) References Cited

U.S. PATENT DOCUMENTS

| | | | |
|---|---|---|---|
| 5,247,660 A | 9/1993 | Ashcraft et al. | |
| 5,347,540 A | 9/1994 | Karrick | |
| 5,394,531 A | 2/1995 | Smith | |
| 6,836,819 B2 | 12/2004 | Kano et al. | |
| 8,713,552 B2 | 4/2014 | Horiuchi et al. | |
| 2004/0162958 A1 | 8/2004 | Kano et al. | |
| 2010/0251206 A1 | 9/2010 | Horiuchi et al. | |

FOREIGN PATENT DOCUMENTS

EP    2026191 A2    2/2009

*Primary Examiner* — Yong J Choe
(74) *Attorney, Agent, or Firm* — Perspectives Law Group, Corp.

(57) ABSTRACT

A method of operation of a storage system includes: collecting performance data including periodically sampling a non-volatile (NV) device for loading a statistics and capacity usage table; comparing a policy and threshold table to the statistics and capacity usage table; and configuring a virtual disk from a network of storage application servers for supplementing or replacing the NV device that exceeded the policy and threshold table while an application continues to utilize the NV device.

20 Claims, 8 Drawing Sheets

STORAGE SYSTEM WITH ALLOCATED STORAGE DEVICE MECHANISM AND METHOD OF OPERATION THEREOF

TECHNICAL FIELD

An embodiment of the present invention relates generally to a storage system, and more particularly to a storage system having allocated storage media having different performance capabilities.

BACKGROUND

Large data centers can require full-time support to maintain the tens of thousands of storage devices they utilize. Most of the maintenance occurs when a device failure has occurred or an internal error detection mechanism, in the storage device, warns of an imminent failure of the data recovery. The data centers can support storage servers running many different applications, operating systems, virtual machines, containers, and so on. Many of these environments have no knowledge of the underlying storage devices as they are too far removed. It is almost impossible to determine, in large scale server-storage systems, the right balance of fast-expensive storage versus low cost bulk storage to ensure the system can meet ever changing application requirements cost effectively.

As the size of the large data centers increase and becomes geographically diverse, it becomes very difficult to maintain the efficient use of the large scale server-storage systems. This can translate into higher costs and more labor to maintain the operational performance of the data center.

Thus, a need still remains for a storage system with allocated storage device mechanism to improve performance and accessibility of user data in diverse data center environments without adding unnecessary labor cost to the system. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a method of operation of a storage system including: collecting performance data including periodically sampling a non-volatile (NV) device for loading a statistics and capacity usage table; comparing a policy and threshold table to the statistics and capacity usage table; and configuring a virtual disk from a pool of NV devices for supplementing or replacing the NV device that exceeded the policy and threshold table while an application continues to utilize the NV device.

An embodiment of the present invention provides a storage system including: a non-volatile (NV) device configured to support an application; an optimization module, coupled to the NV device, configured to collect performance data by periodically sampling the NV device for loading a statistics and capacity usage table; a storage automation and analytics (SAA) server, coupled to the optimization module, comparing a policy and threshold table to the statistics and capacity usage table; and a pool of NV devices, coupled to the SAA server, configured to provide the virtual disk includes combining multiple of the NV devices to support the application for supplementing or replacing the NV device that exceeded the policy and threshold table while the application continues to utilize the NV device.

An embodiment of the present invention provides a non-transitory computer readable media including instructions for a storage system, including: collecting performance data by an optimization module including periodically sampling a non-volatile (NV) device for loading a statistics and capacity usage table; comparing a policy and threshold table to the statistics and capacity usage table; and configuring a virtual disk from a pool of NV devices for supplementing or replacing the NV device that exceeded the policy and threshold table while an application continues to utilize the NV device.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
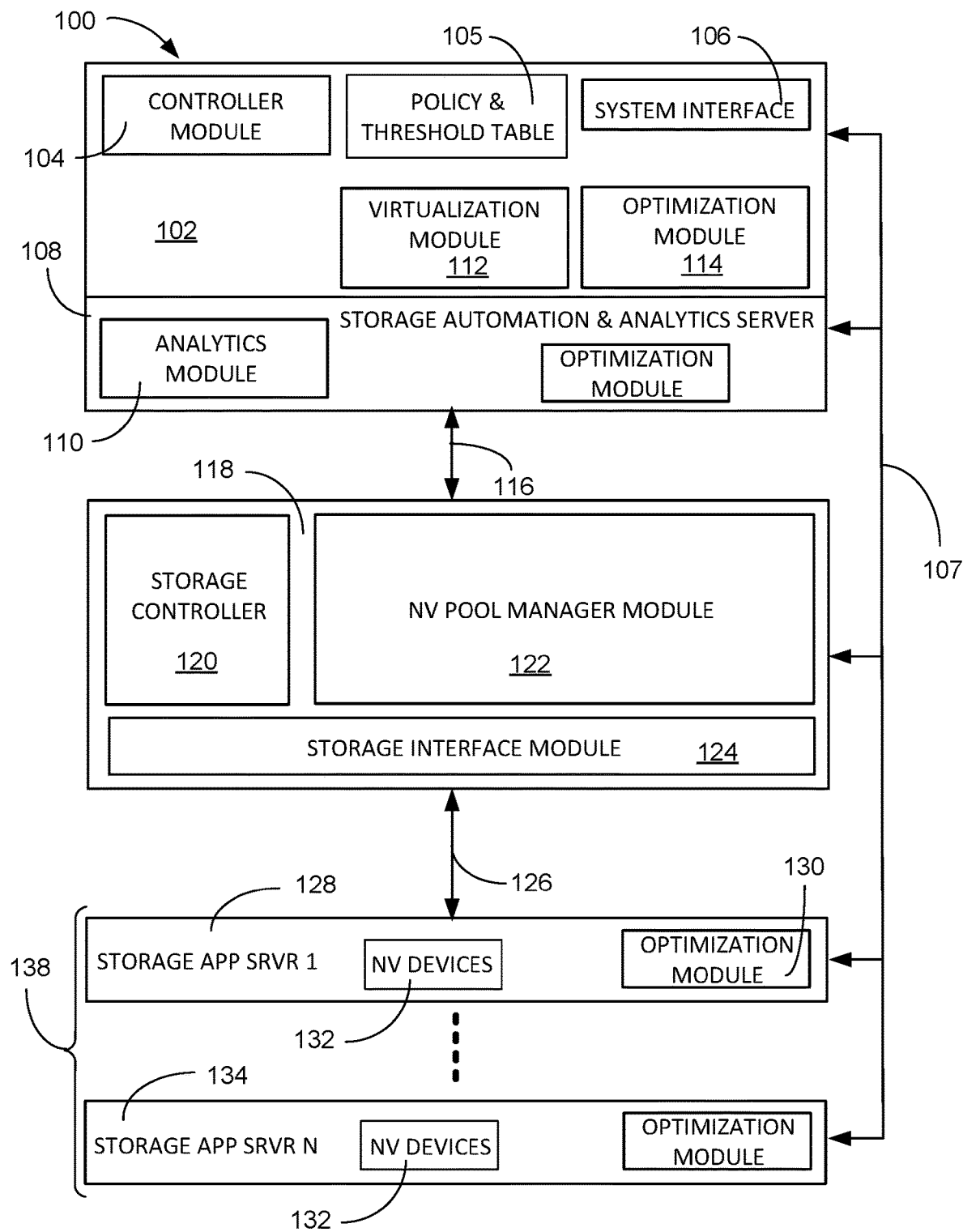
FIG. 1 is a block diagram of a storage system with allocated storage device mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The term "tier" referred to herein is a group or array of storage media devices that have a common performance characteristic. The term "performance characteristic" referred to herein is a measure of data handling capability that can include any device operation and interface timing. Examples of the performance characteristic can include access time, data through-put, interface bandwidth, input-output operations per second (TOPS), endurance, data density, data reliability, and duration of retention of the data. The numerical value of a tier of storage, such as tier zero storage, tier one storage, or tier two storage, can be indicative of its relative performance with tier zero storage being the highest performance and tier two being the lowest performance. The tier zero storage can be formed of an array of a high performance storage device, capable of more than 1000 IOPS, while the tier two storage can be formed of an array of a low performance storage device capable of less than 200 IOPS.

The term "storage media device" referred to herein is an apparatus used for archiving and accessing of data in a computer system environment. For example, the storage media device can be a magnetic disk drive, a solid state disk drive, an optical disk drive, magnetic tape drive, or the like without regard to the interface attachment used.

The term "virtual storage" referred to herein is the total addressable memory available to a computer system that is composed of one or more memory devices, each of which represents a portion of the total addressable memory. The virtual storage is addressed by a virtual address that is translated to a physical address within the one or more memory devices.

The term "module" referred to herein can include a combination of software and hardware capable of supporting the defined module function in an embodiment of the present invention. For example, the software can be machine code, firmware, embedded code, and application software executed on a processor. Also for example, the hardware can be circuitry, processor, computer, integrated circuit, integrated circuit cores, a pressure sensor, an inertial sensor, a microelectromechanical system (MEMS), passive devices, or a combination thereof. The term "virtual disk" referred to herein is defined as a single capacity of non-volatile storage composed of storage capacity from multiple independent non-volatile storage devices.

Referring now to FIG. 1, therein is shown a block diagram of a storage system 100 with allocated storage device mechanism in an embodiment of the present invention. The block diagram of the storage system 100 depicts an application server 102 including an automation controller 104 and a storage automation and analytics (SAA) server 108 is a processor based hardware structure that provides automation and analytics for real-time monitoring and updating of storage resources during execution of an application software. The automation controller 104 can be a processor or embedded processor configured to control a system interface module 106 and manage the operations of the system interface module 106. The SAA server 108. The system interface module 106 can communicate with a $1^{st}$ storage application server 128, an $N^{th}$ storage application server 134, and an on-demand NV pool server 118 through a storage configuration bus 107.

The SAA server 108 can be implemented as instructions on a non-transitory computer readable medium (not shown) to be executed by a system processor (not shown). The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the system or installed as a removable portion of the system. The SAA server 108 can be implemented as a combination of flexible or dedicated hardware configured to execute the instructions from the non-transitory computer readable medium or it can be implemented from dedicated hardware modules. The SAA server 108 has a policies and threshold table 105 that can be used to determine whether an NV device 132 is performing comfortably within its current limits or if it is constantly hitting its hard or threshold limits and thus can benefit from being supplemented or replaced by a fast virtual disk. The spatial analysis performed by the SAA server 108 allows an analytics engine to determine the range of logical block addresses or virtual pages under heavy load and translate that to a capacity requirement.

The SAA server 108 can implement the protocol associated with communicating to a next level system (not shown). The SAA server 108 is capable of performing a variety of storage virtualization functions, including block level tiering, virtual-to-physical device mapping, usage statistics analysis, automated detection of storage limited performance, automated allocation of supplementary storage capacity, and other data management functions.

The storage automation and analytics (SAA) server 108 can be a coupled to the Application server 102 or it can be an added-on component to an existing storage system. The SAA server 108 can be implemented as software running on a processor, dedicated hardware modules including memory devices, support memory maintaining the storage analytics database, or a combination thereof. The SAA server 108 can include an analytics module 110. The analytics module 110 can collect performance data from each of the NV device 132 over a storage interface bus 126 and make decisions about the capacity of fast storage to allocate to the NV device 132 being monitored. The application server 102 can include a virtualization module 112 and an optimization module 114 that enable the interaction with the SAA server 108 for real time analysis and adjustment of the virtual disk provided by the SAA server 108 and the on-demand NV pool server 118.

The virtualization module 112 can monitor the NV device 132 throughout a network of storage application servers 138. The network of storage application servers 138 includes each of the NV device 132 that can be accessed by the application server 102. The virtualization module 112 can provide availability information of the NV device 132 provided in the network of storage application servers 138. The optimization module 114 can interact with the virtualization module 112 to identify the best combination of the NV device 132 available in the network of storage application servers 138. The optimization module 114 can provide automated data migration and tiering for the virtual disk proposed by the virtualization module 112.

The SAA server 108 is coupled to the on-demand NV pool server 118 through a virtualization bus 116. The SAA server 108 can transfer the proposed combination of the NV device 132, utilized to form the proposed virtual disk, through the virtualization bus 116. The on-demand NV pool server 118 can communicate with the 1$^{st}$ storage application server 128 through the N$^{th}$ storage application server 134 in order to reserve the NV device 132 required for the proposed virtual disk.

The on-demand NV pool server 118 can be a specialized peripheral controller that includes a storage controller module 120, an NV pool manager module 122, and a storage interface module 124. The storage controller module 120 can be a processor with support memory, registers, and communication hardware (not shown). The NV pool manager module 122 can include a specialized state processor that accepts a list of the NV device 132, to be included in the virtual disk, and builds communication packets to request the participation of specific ones of the NV device 132. The NV pool manager module 122 can send the communication packets through the storage interface module 124.

The storage interface module 124 communicates through the storage interface bus 126 to the network of storage application servers 138. It is understood that the NV device 132 can be mounted in racks (not shown) that can accommodate up to 32 of the NV device 132, such as solid state devices (SSD), hard disk drives (HDD), tape units, or the like. When the NV device 132 are requested to participate in the collaboration of a new virtual disk, they must respond to indicate their availability to participate. Once the NV pool manager module 122 has received responses from each of the NV device 132 that is part of the proposed virtual disk. The NV pool manager module 122 communicates acceptance to the virtualization module 112 in order to instantiate the proposed virtual disk. The optimization module 114 can start any data migration that is necessary to use the virtual disk and the analytics module 110 can start tracking its performance.

Each of the 1$^{st}$ storage application server 128 through the N$^{th}$ storage application server 134 can include a shelf optimization module 130 that can perform data migration and optimization among the NV device 132 in the network of storage application servers 138. It is understood that some data migration can occur between the shelves of the 1$^{st}$ storage application server 128 through the N$^{th}$ storage application server 134 that can be managed by the shelf optimization module 130 of the storage application servers that are involved.

It has been discovered that the storage system 100 can collect performance data for all of the NV device 132 in the network of storage application servers 138, analyze the performance data to determine whether additional storage resources can improve the performance, propose a new configuration of the NV device 132, and instantiate the new configuration while migrating any data needed for the new configuration. It is understood that this process is fully automated and occurs in real-time without manual intervention. The storage system 100 can optimize the use of the NV device 132 available anywhere within the network of storage application servers 138.

By way of an example, while only the 1$^{st}$ storage application server 128 and the N$^{th}$ storage application server 134 are shown, any number of the storage array can be supported. In practice, the NV device 132 can be deployed in racks (not shown) that can support multiple shelves with each shelf containing up to 32 of the NV device 132. It is apparent that the additional hardware cost/burden of the storage system 100 can significantly reduce the labor costs to support the network of storage application servers 138 while increasing the overall performance of the application servers (not shown) that utilize the storage system 100.

Figure 2:
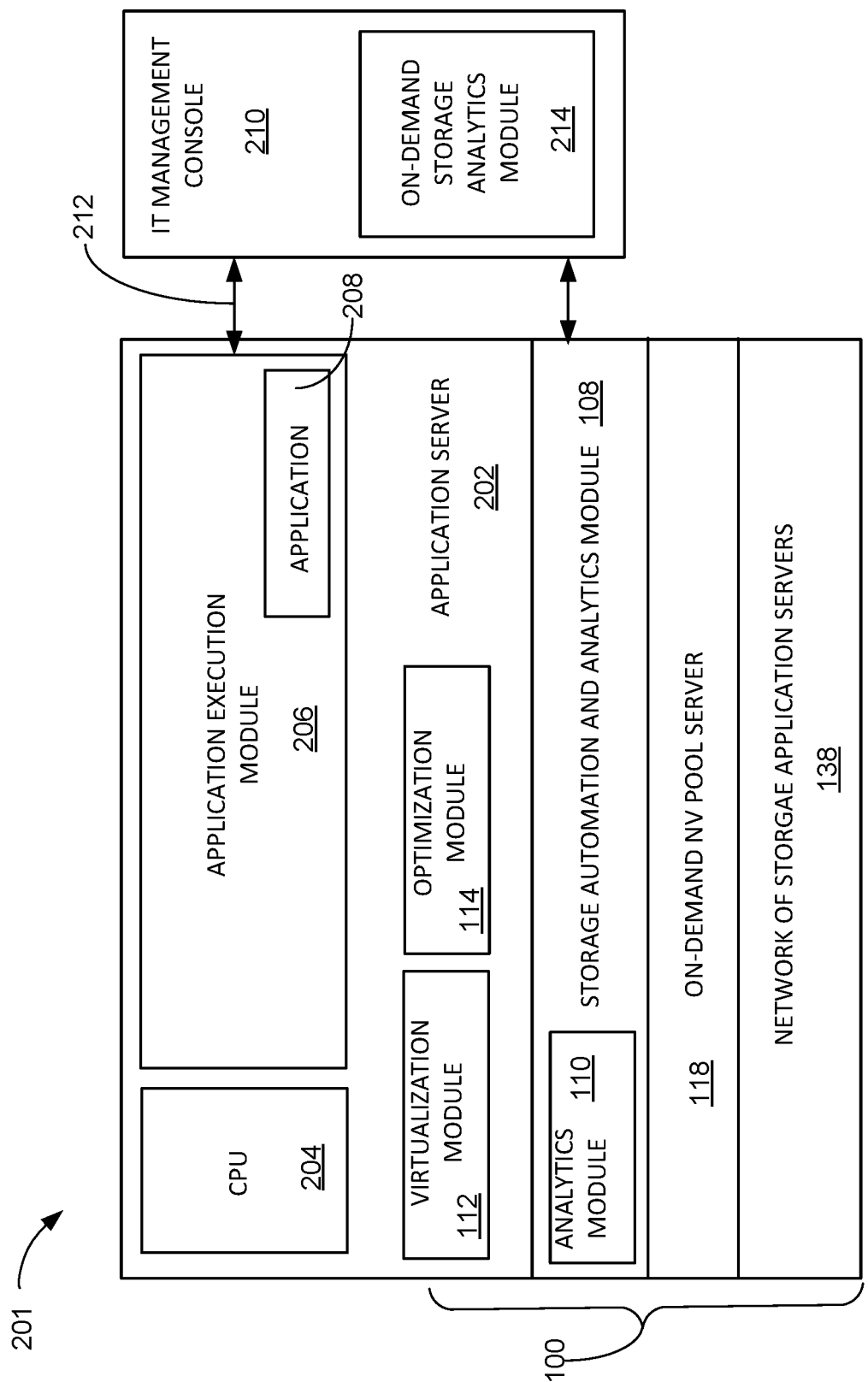
FIG. 2 is a block diagram of an example application of the storage system of FIG. 1.

Referring now to FIG. 2, therein is shown a block diagram of a computer system 201 utilizing the storage system 100. The block diagram of the computer system 201 depicts an application server 202 including a central processing unit (CPU) 204 and an application execution module 206.

The CPU 204 can be any processor including multi-processor devices suitable for high performance execution of an application 208. It is understood that the application 208 can be any type of the application 208 including any database management software, statistical analysis software, sorting software, or process control software. It is further understood that the storage system 100 does not alter the way the application server 202 handles data, but the storage system 100 can significantly improve the performance of the execution of the application server 202, while reducing the labor costs to optimize the computer system 201.

An information technology (IT) management console 210 can be coupled to the application execution module 206 in order to support maintenance and control of the application server 202. A maintenance control bus 212 can provide local or remote access to the application server 202 from the IT management console 210. The addition of an on-demand storage analytics module 214 allows the establishment of policies and thresholds that guide the operation of the storage system 100. The on-demand storage analytics module 214 can be accessed by the SAA server 108 in order to download the parameters that define the target performance and define the network of storage application servers 138.

It is understood that the parameters required to define the on-demand NV storage replacement function can be downloaded into the SAA server 108 from the IT management console 210 or they can be loaded into the SAA server 108 by other means. It is further understood that the function of the IT management console 210 can be reduced to displaying the current state of the application server 202, while the performance maintenance is fully performed by the storage system 100.

It has been discovered that the storage system 100 can improve the performance of the computer system 201 by maintaining the best performance support of the NV device 132 that are required by the application 208 being executed. The automatic adjustment of the storage resources required to maintain the best possible performance of the computer system 201 is performed by the SAA server 108 and the on-demand NV pool server 118 without manual intervention by a person. When the application 208 is completed, the NV device 132 used by the application 208 are returned to the network of storage application servers 138 for use by a different one of the application 208.

Figure 3:
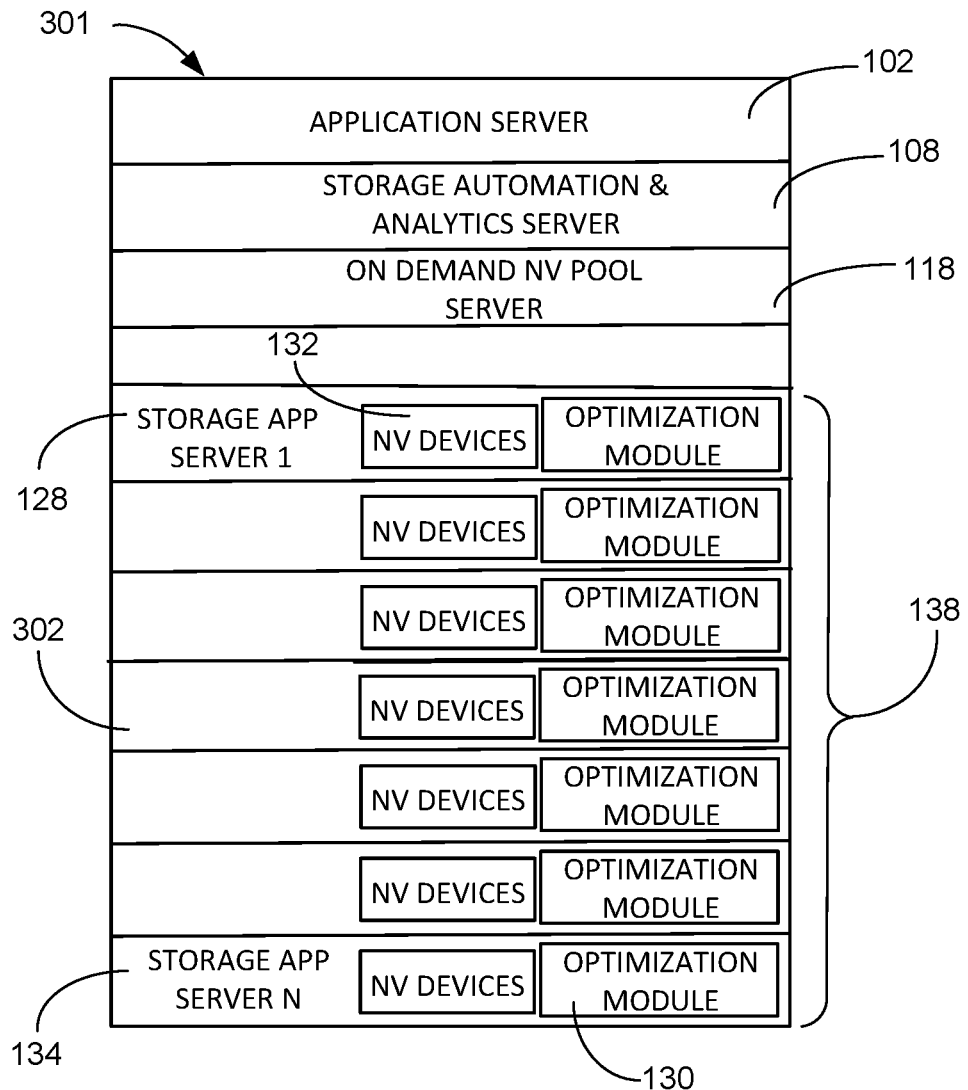
FIG. 3 is an exemplary block diagram of a rack configuration for the storage system of FIG. 1.

Referring now to FIG. 3, therein is shown an exemplary block diagram of a rack configuration 301 for the storage system of FIG. 1. The exemplary block diagram of the rack configuration 301 depicts a number of shelves 302 containing the network of storage application servers 138 including the NV device 132 and the shelf optimization module 130. Also present in the rack configuration is the Application server 102, the SAA server 108, and the on-demand NV pool server 118. The shelves 302 can include the 1$^{st}$ storage application server 128 through the N$^{th}$ storage application server 134. The shelves 302 are a hardware structure used for mounting and electrically connecting the NV device 132 in the rack configuration 301.

The rack configuration 301 can include all of the shelves 302 in the network of storage application servers 138 or only a portion of the shelves 302 can be included. The size of the network of storage application servers 138 can be changed by linking additional racks (not shown) or by restriction the number of the shelves 302 assigned to the application server 202 of FIG. 2.

It is understood that the storage configuration bus 107 and the storage interface bus 126 can be routed within the rack configuration 301 and are not visible. The rack configuration 301 can be extended by adding cables to support the storage interface bus 126. The storage configuration bus 107 must be present in any additional rack added to the rack configuration 301.

It has been discovered that the rack configuration 301 can provide a large number of the NV device 132 for the network of storage application servers 138 without requiring additional human resources to maintain the performance of the application server 202. The rack configuration 301 allows for customizing the size of the network of storage application servers 138 within a single rack or housed in multiple racks (not shown). The dynamic nature of the demand for the NV device 132 can be met by the storage system 100 of FIG. 1. When the application 208 of FIG. 2 is in heavy storage activity, additional resources of the NV device 132 can be added to the virtual disk to support the operation. When the application 208 has completed the heavy storage activity, the unnecessary units of the NV device 132 are returned to the network of storage application servers 138 without manual intervention.

Figure 4:
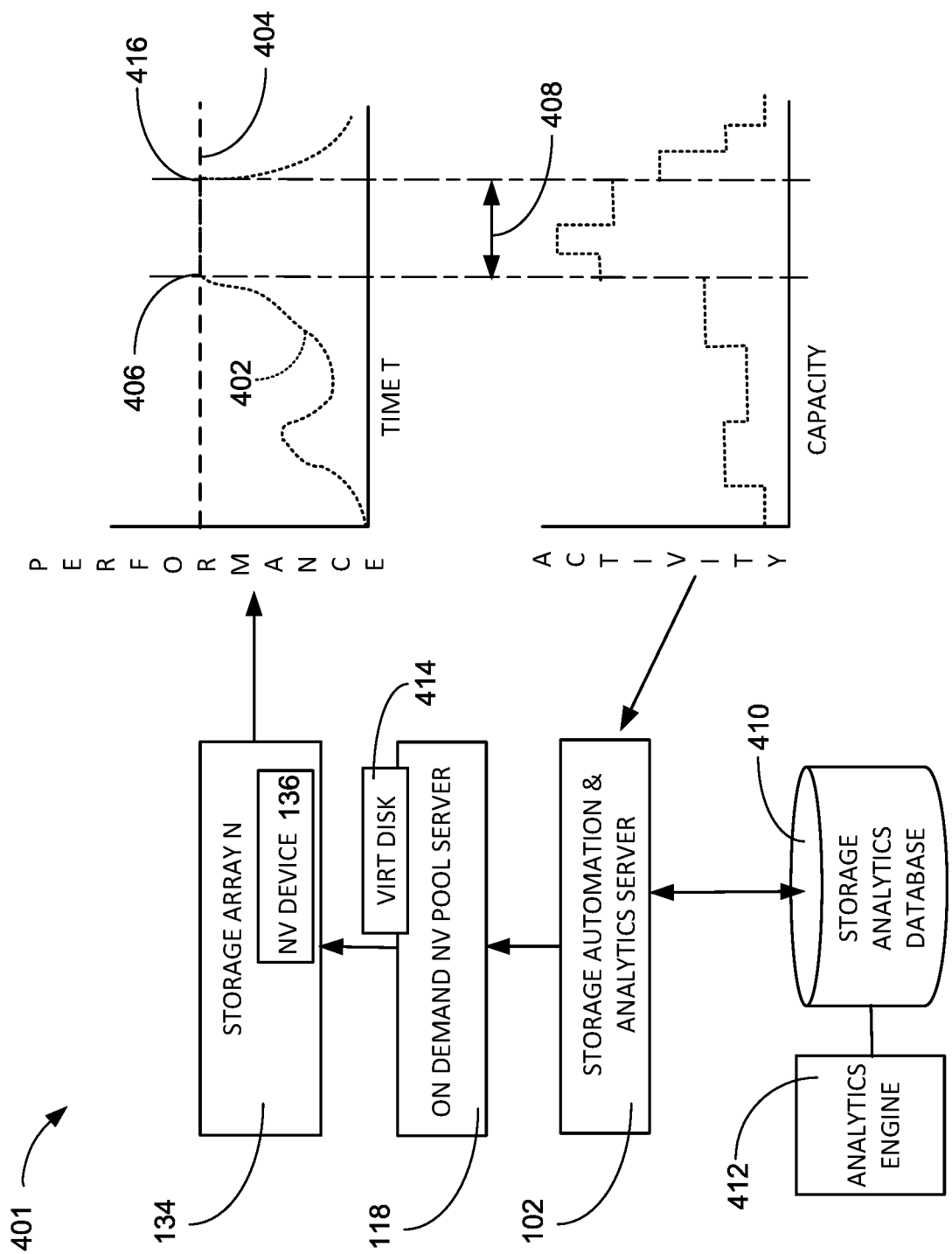
FIG. 4 is an architectural block diagram of an automatic update of allocated storage media in the storage system of FIG. 1.

Referring now to FIG. 4, therein is shown an architectural view of provisioning and virtualizing storage 401 automatically based on time and special performance. The architectural view of provisioning and virtualizing storage 401 depicts the NV device 132 under heavy load while executing the application 208 of FIG. 2.

The performance graph on the right shows a work load 402 put on the NV device 132 during the execution of the application 208. As the work load 402 increases, a performance limit 404, for the NV device 132, can be reached at saturation point 406. The capacity graph indicates a high usage region 408 having an amount of the capacity over a high usage threshold.

The SAA server 108 can monitor the performance and capacity of the NV device 132. When the saturation point 406 is detected, the SAA server 108 can store the performance and capacity information in a storage analytics database 410. An analytics engine 412 can perform a trend analysis of the work load 402 in order to determine the amount of additional disk capacity that must be virtualized in order to meet the demands of the application 208. The analytics engine 412 can be a state machine or state processor that can determine what capacity would be required in a virtual disk 414. When the analytics engine 412 has provided the capacity information, the SAA server 108 can instruct the on-demand NV pool server 118 to provide the virtual disk 414 to the $N^{th}$ storage application server 134. The virtual disk 414 can supplement or replace the NV device 132 that exceeded the policy and threshold table while executing the application 208 of FIG. 2. The virtual disk 414 can be made up from the NV device 132 of FIG. 1.

The incorporation of the virtual disk 414 to the NV device 132 can cause the work load 402 to be reduced and the high usage region 408 to end. It is understood that the virtual disk 414 can be a supplement to the NV device 132 or a replacement for it. If the virtual disk 414 is a replacement for the NV device 132, the shelf optimization module 130 can immediately migrate the data from the NV device 132 to the virtual disk 414 without manual intervention.

At a workload decrease point 416 the addition of the virtual disk 414 can ease the requirement for the additional resources and a portion of the virtual disk 414 can be returned to the network of storage application servers 138. The automatic virtualization of resources from the network of storage application servers 138 can increase the performance of the application 208 without manual intervention. The parameters used by the analytics engine 412 to can be customized by an IT professional or they can be established by a default system parameter.

Performance data is collected from one or more of the NV device 132 in the network of storage application servers 138. The performance data is collected over time in two dimensions; time interval and space/capacity utilized. For time measurements, the NV device 132 actual performance is measured against a pre-determined limit or threshold which can either be set by a user or is simply the hard limit of the device determined through baseline measurements during setup.

The performance data is periodically sent to the SAA server 108 where it is stored in the storage analytics database 410 for later retrieval and analysis or processed immediately. The SAA server 108 has policies that can determine if the NV device 132 is performing comfortably within its current limits or if it is constantly hitting it's hard or threshold limits and thus can benefit from being merged or replaced by a virtual disk having higher performance capabilities. The spatial analysis allows the analytics engine 412 to determine the range of logical block addresses or virtual pages under heavy load and translate that to a capacity requirement.

The SAA server 108 will then request from the on-demand NV pool server 118 a specific size and performance requirement for the virtual disk 414 to be presented to the network of storage application servers 138 being monitored. If the requested capacity is available, the virtual disk 414 is then created and presented over the storage interface bus 126 to the storage server and the appropriate disk merged, virtualized or replaced by the SAA server 108 to create a higher performance disk while the original disk is still being used or accessed by the application 208. This same process can be used to return the virtual disk 414 to the network of storage application servers 138.

It has been discovered that the storage system 100 provides the means for dynamically managing the virtual disk 414 in real-time to enhance the execution performance of the application 208. The interaction of the SAA server 108 and the analytics engine 412 can provide the correct size of the virtual disk 414 to complete the application 208 without a lengthy evaluation and test process. The real-time execution of the storage system 100 can improve overall data center performance without adding cost or labor.

Figure 5:
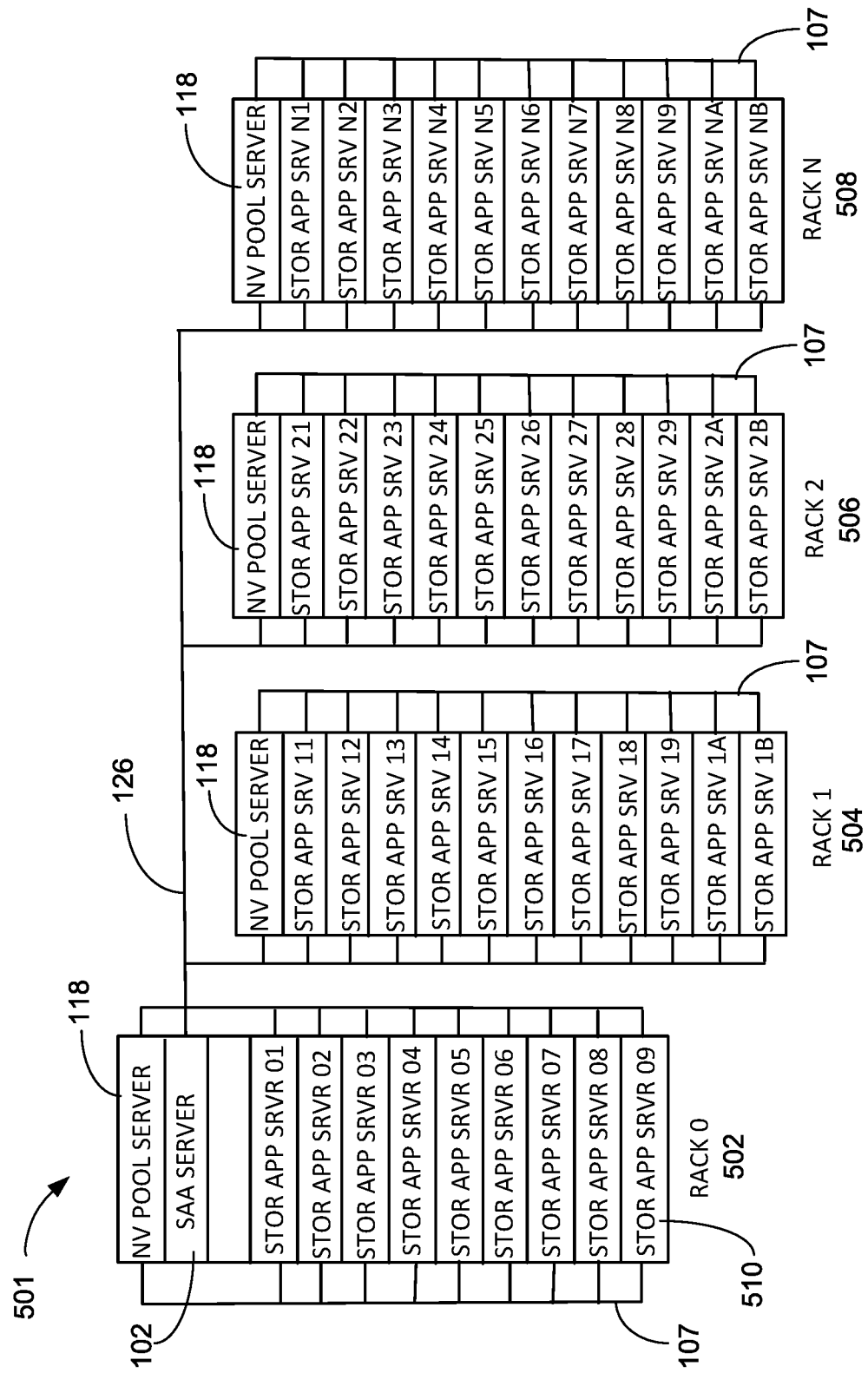
FIG. 5 is an exemplary block diagram of the storage system of FIG. 1 in a multi-rack environment.

Referring now to FIG. 5, therein is shown an architectural view of a multi-rack configuration 501 of the storage system 100. The architectural view of the multi-rack configuration 501 depicts a rack 0 502 that represents the storage system 100 of FIG. 1 as originally described. The addition of rack 1 504, rack 2 506, and rack N 508 provides an increase in the size of the network of storage application servers 138 of FIG. 1

Each of the racks can support multiple shelves 510. Each of the shelves 510 can support a number of the NV device 132 of FIG. 1, such as 32 of the NV device 132 per shelf. The rack 0 502 can include the SAA server 108 and the on-demand NV pool server 118 as well as a number of the $N^{th}$ storage application server 134 of FIG. 1. Each of the rack 1 504, the rack 2 506 and the rack N 508 can include the on-demand NV pool server 118 which is coupled to the SAA server 108 in the rack 0 502. The SAA server 108 does not reside in each of the additional racks. The storage interface bus 126 can couple the SAA server 108 to the on-demand NV pool server 118 that resides in the rack 1 504, the rack 2 506 through the rack N 508. It is also understood that each of the shelves 510 can include the shelf optimization module 130 for collecting the statistics for each of the NV device 132 that resides on the shelves 510.

In a large data center, the storage system 100 can automatically allocate and de-allocate the NV device 132 on-demand. The NV device 132, from the network of storage application servers 138, is typically deployed in each rack where the on-demand NV pool server 118 reside. A single copy of the SAA server may be deployed in one of the racks and manage multiple racks of the pool of NV devices. Lastly, each node that requires dynamic flash allocation would have the storage virtualization software installed that supports the analytics performance measurements in time and space plus the ability to add or remove the NV device 132 dynamically without disturbing the user's data volumes and while they are still be used.

It has been discovered that the multi-rack configuration 501 can provide expansion capabilities that meet the needs of large data centers that are centrally located or dispersed over great distances. The automatic virtualization of disk capacity both increases performance of the application 208 execution and reduces the labor associated with provisioning the resources from the network of storage application servers 138.

Figure 6:
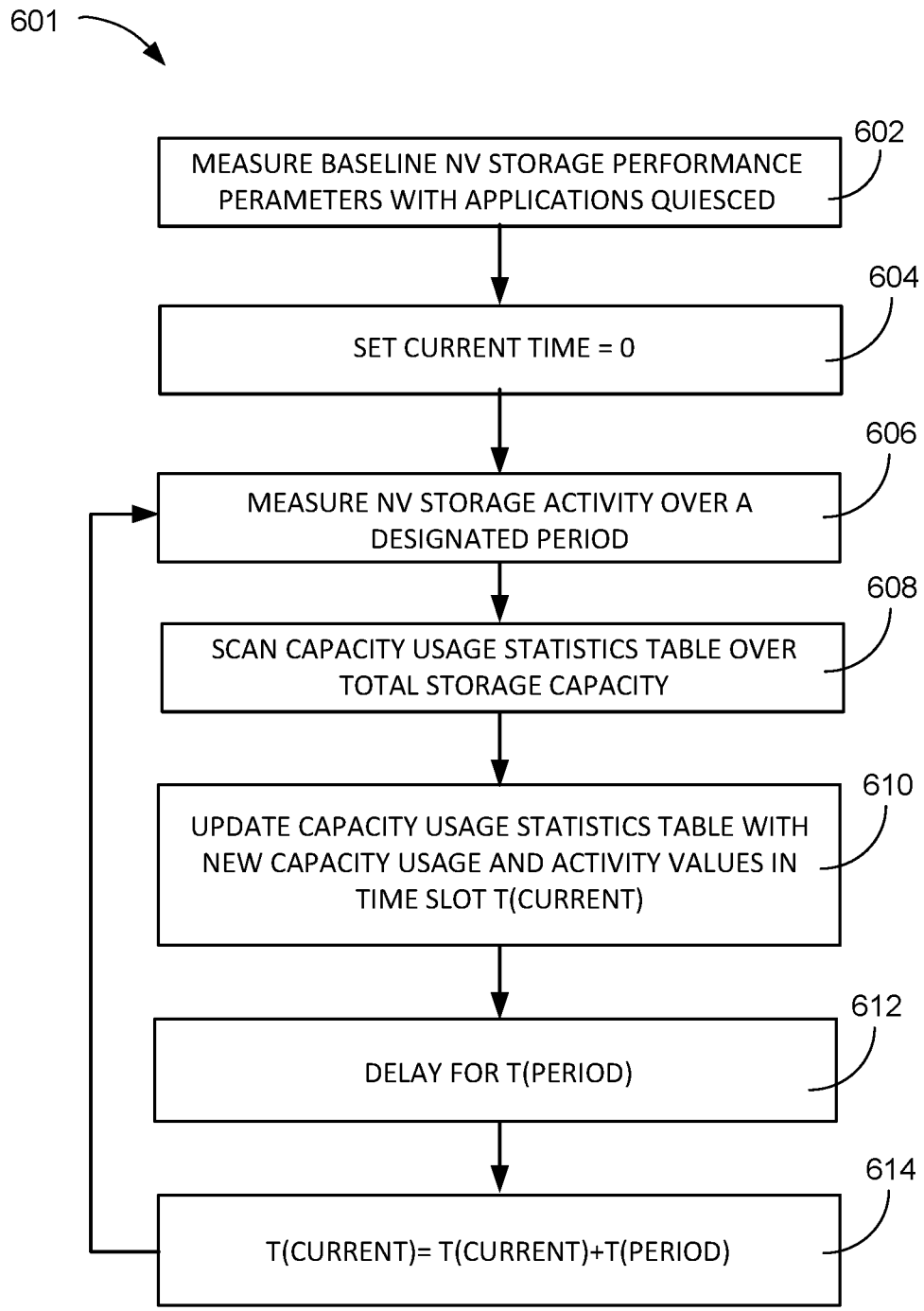
FIG. 6 is a flow diagram of a node level operation of the storage system of FIG. 1.

Referring now to FIG. 6, therein is shown a flow diagram of an operation 601 of the shelf optimization module 130 FIG. 1. The flow diagram of the operation 601 of the shelf optimization module 130 can include a measure baseline NV storage performance in a block 602. The measure baseline NV storage performance in the block 602 can operate at power-up time or anytime the activity of the application 208 is quiesced. The baseline NV storage performance in the block 602 can give a sample of the best performance available from the NV device 132 of FIG. 1. The flow proceeds to an initialize time block 604.

In the initialize time block 604, the Application server 102 of FIG. 1 can instruct the shelf optimization module 130 to set the time reference to zero. In this way all of the shelves that are accessed by the SAA server 108 can have the same time reference. This is an important aspect since the input from each of the shelf optimization module 130 will provide performance and trend analysis used for the entirety of the storage system 100. The flow proceeds to a measure NV storage activity block 606.

The measure NV storage activity block 606 can provide an indication of the demand put upon the NV device 132 used by the application 208 of FIG. 2. The measure NV storage activity block 606 will last for a specific period for all of the shelf optimization module 130 in the network of storage application servers 138. The flow proceeds to a scan capacity usage statistics table in a block 608.

The scan capacity usage statistics table in the block 608 can determine the current distribution of the workload across the network of storage application servers 138. By scanning all of the capacity usage statistics table, the SAA server 108 can better deal with the changing workload of a busy data center in real-time and without assistance. The shelf optimization module 130 for each of the shelves 510 of FIG. 5 can provide performance and capacity data to the SAA server 108 for saving into the storage analytics database 410 of FIG. 4. The flow then proceeds to an update capacity usage statistics table in block 610.

In the update capacity usage statistics table in block 610. The shelf optimization module 130 can provide the SAA server 108 with a snapshot of the workload that occurred during the specific period captured by all of the shelf optimization module 130. The performance data is recorded in a specific time slot of the storage analytics database 410. This can be used later for trend analysis as the work load 402 of FIG. 4 increases. The flow then proceeds to a delay block 612.

The delay block 612 can be set for each of the shelf optimization module 130. The delay provides a data collection period for the shelf optimization module 130. It is understood that the data collection period can be the same for all of the shelf optimization module 130 or it can be staggered to lessen the congestion on the storage interface bus 126 of FIG. 1. The flow then proceeds to an update time block 614.

The update time block 614 can uniformly maintain the time stamp for the download of the storage analytics database 410. The current time is update by the previous time period having the delay period added to become the new current time. The update time block 614 allows the shelf optimization module 130 to collect the performance data for every one of the shelves 510 in the network of storage application servers 138. The reporting time for each of the shelf optimization module 130 can be different as long as the interval recorded is the same. The flow then proceeds back to the measure NV storage activity block 606 to continue monitoring the usage data for the pool of NV devices. This process will continue as long as the power remains on and there is the work load 402 to perform.

It has been discovered that by establishing the initial time period in all of the measure NV storage activity block 606 in the shelf optimization module 130, a clear picture of the workload and distribution can be obtained. By maintaining the capacity and performance data as a history file for every one of the NV device 132, the SAA server 108 can identify weak or failing units among the network of storage application servers 138. The SAA server 108 can also pre-load extra resources of the NV device 132 for specific ones of the application 208. This insight can help the storage system 100 refine an initial set-up for repeated execution of the application 208.

Figure 7:
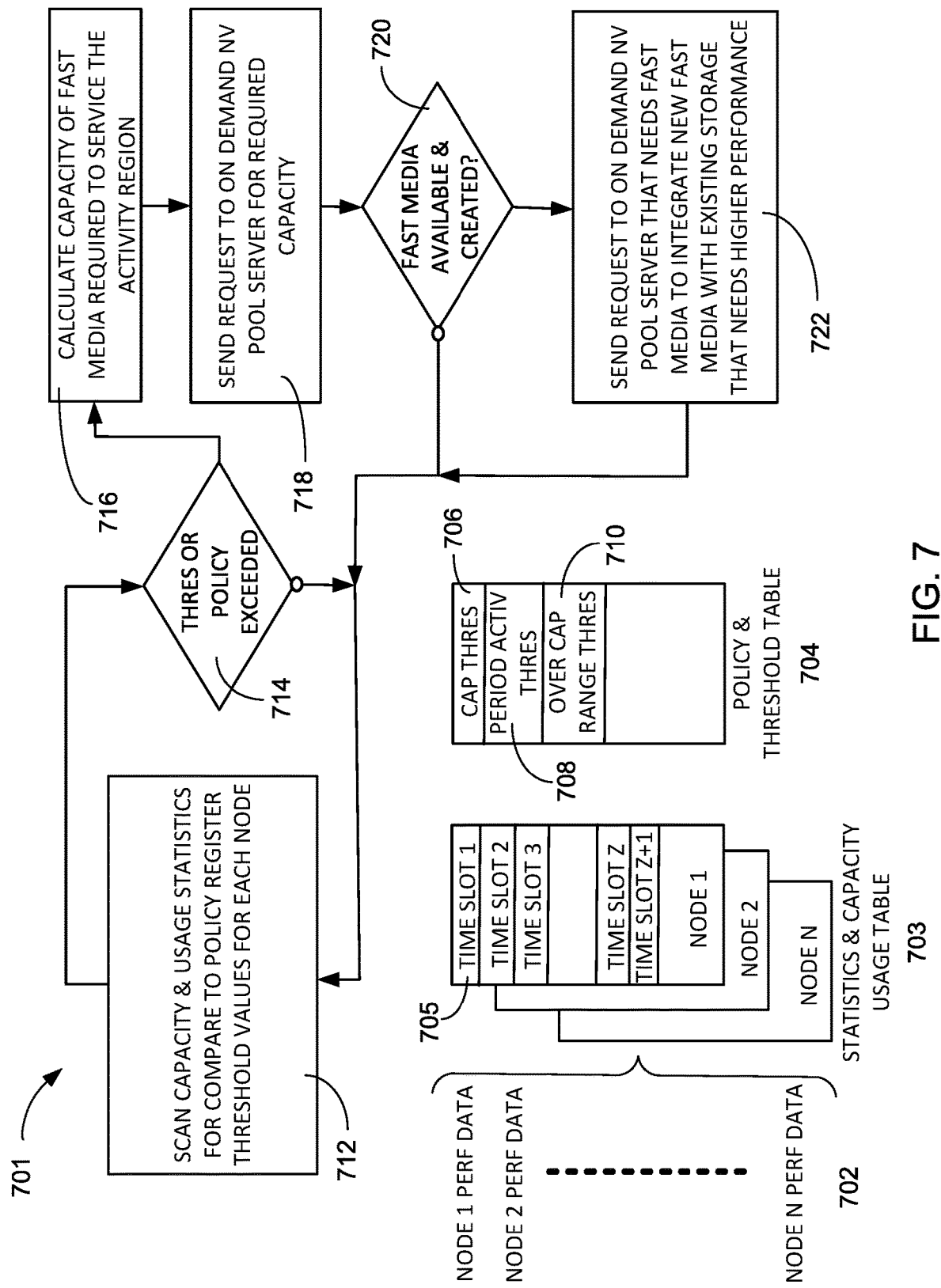
FIG. 7 is a flow diagram of a storage automation and analytics (SAA) server in a capacity update of the storage system of FIG. 1.

Referring now to FIG. 7, therein is shown a flow diagram of an operation 701 of the SAA server 108 of FIG. 1 in a capacity update of the storage system of FIG. 1. The flow diagram of the operation 701 of the SAA server 108 depicts an input flow of performance data 702 for each node of the network of storage application servers 138 of FIG. 1.

The SAA server 108 can update a statistics and capacity usage table 703 for the current time slot 705 for every one of the NV device 132 in the network of storage application servers 138. The statistics and capacity usage table 703 is defined as a group of files in the storage and analytics database 410 of FIG. 4. There can be one of the statistics and capacity usage table 703 for each of the NV device 132 in the network of storage application servers 138. The statistics and capacity usage table 703 can maintain a running log of the input flow of the performance data 702 for each of the NV device 132 in the network of storage application servers 138 in each of the time period being recorded. The SAA server 108 can also access a policy and threshold table 704. The policy and threshold table 704 can define what conditions solicit responses in the storage system 100. The policy and threshold table 704 can be pre-loaded from the factory or it can be customized dynamically or statically at the time of installation of the storage system 100.

The policy and threshold table 704 can include a capacity threshold 706, a period activity threshold 708, and an over capacity range threshold 710. The use of the thresholds and policies can define the actions taken by the SAA server 108 during heavily loaded periods. The performance data 702 is collected from one or more of the NV device 132 in the network of storage application servers 138. The performance data 702 is collected over time in two dimensions; time and space/capacity. For time measurements, the actual performance of the NV device 132 is measured against a pre-determined limit or threshold which can either be set by a user or is simply the hard limit of the device determined through baseline measurements during setup.

Once the statistics and capacity usage table 703 is updated, the SAA server 108 can scan the statistics and capacity usage statistics table and compare the policies and threshold table to determine the status of each of the NV device 132 in a block 712. The flow then proceeds to a threshold or policy exceeded check block 714 to determine whether any of the reporting nodes should be complemented or replaced. If none of the policies or thresholds is exceeded, the flow returns to the block 712 to await the next update of the statistics and capacity usage table 703. If however, the threshold or policy exceeded check block 714 determines that a threshold or policy has been exceeded, the flow proceeds to a calculate capacity of the virtual disk in a block 716

The calculate capacity of the virtual disk in the block 716 can utilize the analytics engine 412 to determine what capacity is required in the virtual disk 414 to satisfy the policy or threshold that was exceeded. Having determined what is required of the virtual disk, the SAA server can send a request to the on-demand NV pool server for verification of availability in a block 718.

A check availability block 720 can determine that the required virtual disk is not available for immediate instantiation, the flow returns to the block 712 to await the next update of the statistics and capacity usage table 703. If the virtual disk 414 can be instantiated, the flow proceeds to a send request to the on-demand NV pool server 118 in the rack with the node that exceeded the policy or threshold. The virtual disk 414 can actually be more than one of the NV device 132 to compliment or replace the node that is having issues.

It has been discovered that the operation 701 of the SAA server 108 can dynamically update the NV device 132 support required to maintain the performance and reliability of the storage system 100. By tracking the performance of the NV device 132 under load, weak devices can be identified and replaced during a normal maintenance cycle. The execution of the application 208 can be assured by the real-time replacement of the NV device 132 from the network of storage application servers 138.

Figure 8:
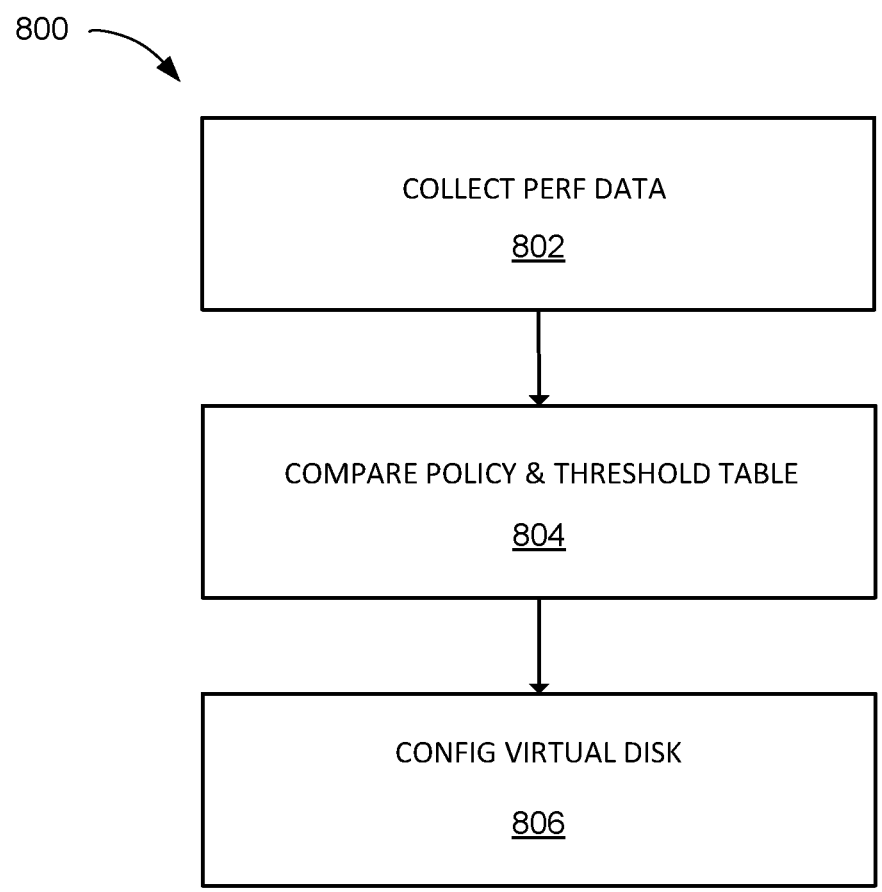
FIG. 8 is a flow chart of the method of operation of a storage system in an embodiment of the present invention.

Referring now to FIG. 8, therein is shown a flow chart of a method 800 of operation of a storage system 100 in an embodiment of the present invention. The method 800 includes: collecting performance data by an optimization module including periodically sampling an NV device for loading a statistics and capacity usage table in a block 802; comparing a policy and threshold table to the statistics and capacity usage table in a block 804; and configuring a virtual disk from a network of storage application servers for complimenting or replacing the NV device that exceeded the policy and threshold table while an application continues to utilize the NV device in a block 806.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operation of a storage system comprising:
    collecting performance data including periodically sampling a non-volatile (NV) device for loading a statistics and capacity usage table;
    comparing a policy and threshold table to the statistics and capacity usage table; and
    configuring a virtual disk from a network of storage application servers for supplementing or replacing the NV device that exceeded the policy and threshold table while an application continues to utilize the NV device.

2. The method as claimed in claim 1 further comprising returning the virtual disk to the network of storage application servers by an on-demand NV pool server when the application is completed.

3. The method as claimed in claim 1 further comprising calculating a capacity of the virtual disk by an analytics engine.

4. The method as claimed in claim 1 wherein configuring the virtual disk from the network of storage application servers includes combining multiple of the NV device to support the application.

5. The method as claimed in claim 1 wherein loading the statistics and capacity usage table includes loading a time slot with the performance data for each of the NV device in the network of storage application servers.

6. The method as claimed in claim 1 further comprising accessing an on-demand storage analytics module in an information technology (IT) management console for accessing the policy and threshold table.

7. The method as claimed in claim 1 wherein configuring the virtual disk includes an on-demand NV pool server verifying the availability of the NV device and presenting the virtual disk to an Nth storage application server, wherein the value of N is an integer greater than one.

8. A storage system comprising:
    a non-volatile (NV) device configured to support an application;
    an optimization module, coupled to the NV device, configured to collect performance data by periodically sampling the NV device for loading a statistics and capacity usage table;
    a storage automation and analytics (SAA) server, coupled to the optimization module, comparing a policy and threshold table to the statistics and capacity usage table; and
    a network of storage application servers, coupled to the SAA server, configured to provide a virtual disk includes combining multiple of the NV device to support the application for supplementing or replacing the NV device that exceeded the policy and threshold table while the application continues to utilize the NV device.

9. The system as claimed in claim 8 further comprising an on-demand NV pool server, coupled to the SAA server, configured to return the virtual disk to the network of storage application servers when the application is completed.

10. The system as claimed in claim 8 wherein the SAA server includes an automation controller configured to calculate a capacity for the virtual disk.

11. The system as claimed in claim 8 further comprising an on-demand NV pool server, coupled to the SAA server, configured to provide the virtual disk from the pool of NV devices includes combining multiple of the NV device to support the application.

12. The system as claimed in claim 8 further comprising a storage interface bus, coupled to the network of storage application servers, configured to load the statistics and capacity usage table includes loading a time slot with the performance data for each of the NV device in the network of storage application servers.

13. The system as claimed in claim 8 further comprising an information technology (IT) management console, coupled to the SAA server, including an on-demand storage analytics module configured to access the policy and threshold table.

14. The system as claimed in claim 8 further comprising an on-demand NV pool server, coupled to the network of storage application servers, configured to provide the virtual disk includes presenting the virtual disk to an Nth storage application server, wherein the value of N is an integer greater than one.

15. A non-transitory computer readable media comprising:
  collecting performance data by an optimization module including periodically sampling an NV device for loading a statistics and capacity usage table;
  comparing a policy and threshold table to the statistics and capacity usage table; and
  configuring a virtual disk from a network of storage application servers for supplementing or replacing the NV device that exceeded the policy and threshold table while an application continues to utilize the NV device.

16. The non-transitory computer readable media as claimed in claim 15 further comprising returning the virtual disk to the network of storage application servers by an on-demand NV pool server when the application is completed.

17. The non-transitory computer readable media as claimed in claim 15 further comprising calculating a capacity of the virtual disk by an analytics engine.

18. The non-transitory computer readable media as claimed in claim 15 wherein configuring the virtual disk from the network of storage application servers includes combining multiple of the NV device to support the application.

19. The non-transitory computer readable media as claimed in claim 15 wherein loading the statistics and capacity usage table includes loading a time slot with the performance data for each of the NV devices in the network of storage application servers.

20. The non-transitory computer readable media as claimed in claim 15 further comprising accessing an on-demand storage analytics module in an information technology (IT) management console for accessing the policy and threshold table.

* * * * *